Nov. 21, 1950     F. A. HARVEY     2,531,335
NOLOAD SPEED GOVERNOR
Filed April 25, 1947     2 Sheets—Sheet 1
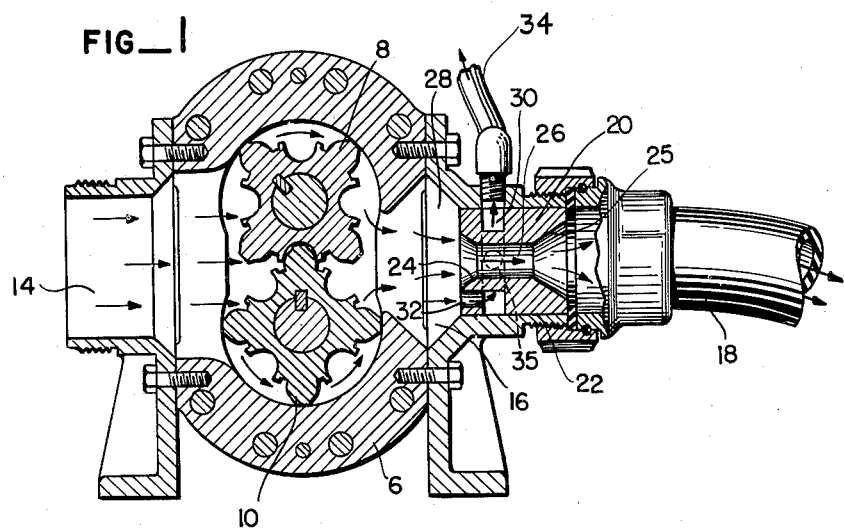
FIG—1
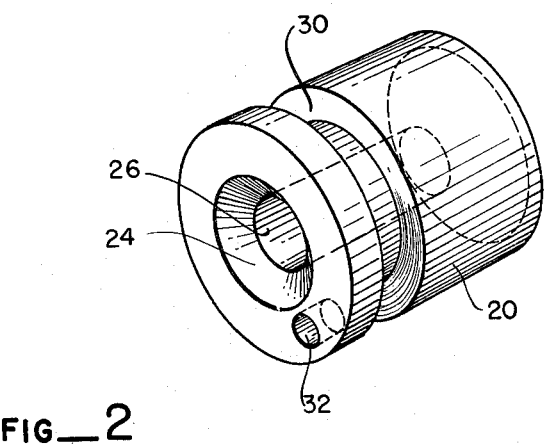
FIG—2
FRANCIS A. HARVEY
*INVENTOR.*
BY *Smith & Tuck*
ATTORNEYS Nov. 21, 1950  F. A. HARVEY  2,531,335
NOLOAD SPEED GOVERNOR
Filed April 25, 1947  2 Sheets-Sheet 2
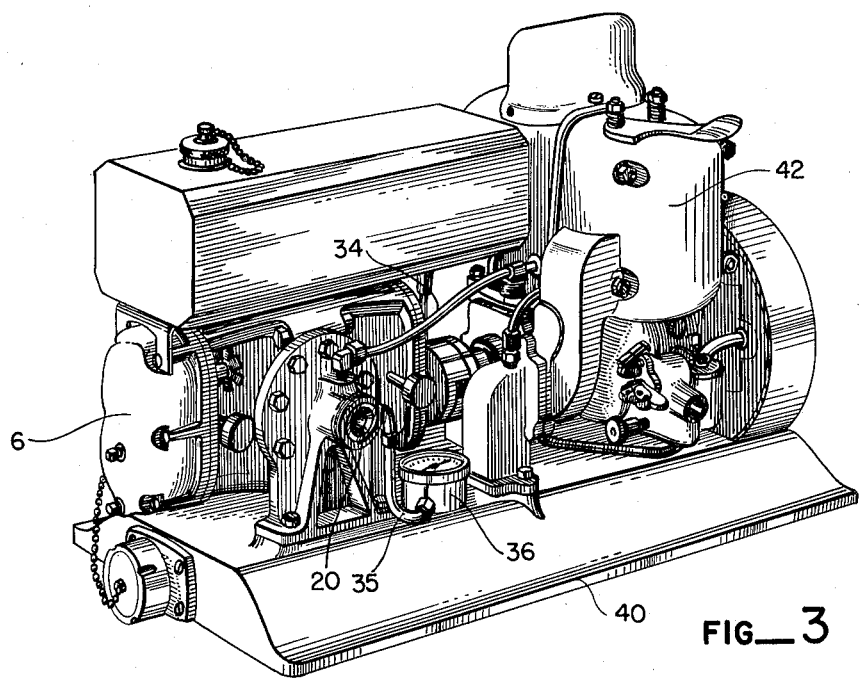
FIG_3
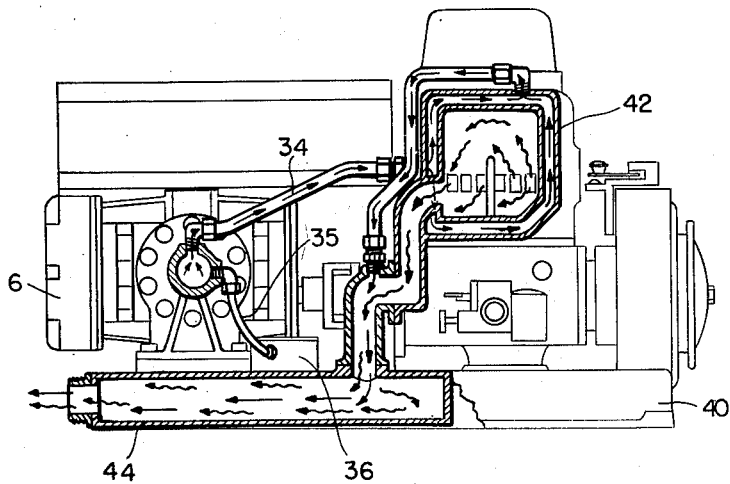
FIG_4
FRANCIS A. HARVEY
*INVENTOR.*
BY Smith & Tuck
ATTORNEYS Patented Nov. 21, 1950

2,531,335

UNITED STATES PATENT OFFICE 2,531,335

NO-LOAD SPEED GOVERNOR

Francis A. Harvey, Bellevue, Wash., assignor to Pacific Marine Supply Company, Seattle, Wash.

Application April 25, 1947, Serial No. 743,773

3 Claims. (Cl. 103—1)

My present invention relates to the general art of governing devices for internal combustion engines and, more particularly to a no-load speed governor.

This invention relates specifically to internal combustion engine driven fluid pumps of the direct connected type, wherein a power head of the high speed type is directly connected to a modified gear-type pump of a design capable of efficient functioning at high rotative speeds. This type of equipment is generally referred to as portable pumps, and they were used very extensively by the Navy for the control of fires aboard war-ships, particularly aircraft carriers which were subject to enemy damage. Originally, however, this type of equipment was designed largely for use in fighting forest fires. In each instance, however, it is very essential that the equipment be very light and easily transported about, so that it may be quickly placed in most advantageous position for combatting fires of considerable magnitude. The requirements placed upon such equipment, therefore, make it necessary to construct the pump and its driving power head, together with all associated parts, in a very light weight style. This lightness of construction, coupled with the high rotative speeds that it is necessary to achieve in order to get adequate output from the unit, makes it very susceptible to abuse, and it is to overcome this unintentional abuse so often heaped upon this type of equipment by those who are not skilled, that I have provided my present "No Load Speed Governing Device."

A pumping unit of this general type is normally best provided with a water-cooled power head which draws its water from the pressure line or pump discharge. Now it has been found that under ideal operating conditions, the motor is under the load of moving a high volume of water against very appreciable heads. There are many uses, however, to which this type of equipment is put, wherein it is merely desired to move water, as in pumping out a scow or a sinking vessel, where no nozzle is placed on the discharge hose and, therefore, the only head on the pump is that due to friction in the hose and the actual static head against which the water is being raised. In such cases, greater volume is obtained, but the motor is actually operating under practically a "no load" condition, and as most of these units of the type illustrated operate at approximately 4000 R. P. M., and at that speed deliver about 10 H. P., the instant that the load is lessened, rotative speeds climb very high until destructive speeds are reached. To further complicate this condition, when there is no appreciable pressure on the output side of the pump, then the water tends to flow out the hose rather than through the more tortuous passage required when it is being led from the pump through the engine cylinder casting and back into the exhaust of the motor.

It has been found that, because of the foregoing circumstances, many hundreds of these expensive highly developed high speed pumps are ruined each year, just due to their having no adequate means of quickly arresting the high rotative speed, especially when coupled with their lack of circulation of cooling water.

The principal object of my invention, therefore, is to provide a restrictive throttling means in the output side of a pump, which will always place the motor under some load due to the pressure built up by the restriction.

A further object of my present invention is to provide a throttling governing device so proportioned and so situated on the pump output that it does not impair the efficiency or output of the pump appreciably for any uses to which it may be put.

A further object of my invention is to provide means which will at all times insure sufficient pressure on the output side of a pump, so that adequate cooling water will be at all times supplied to the power head driving the pump.

A further object of my invention is to provide a throttling means which will at all times be operative in a portable power pump and which will definitely provide against any appreciable rise in no-load speeds.

A further object of my invention is to provide a governing device which has no working parts that can get out of order through lack of attention or minor damage.

Further objects, advantages and capabilities will be apparent from the description and disclosure in the drawings, or may be comprehended or are inherent in the device.

In the drawings:

Fig. 1 is a vertical sectional view taken transversely through the intake and exhaust openings of a high-speed gear-type pump in which my invention is shown in place.

Fig. 2 is a perspective view showing my restrictive governing device.

Fig. 3 is a perspective view showing a portable power pump of the type for which my device is very suitable.

Fig. 4 is a vertical view, largely in section, showing the water circulation through a high speed portable pump to which my equipment is applied.

Referring more particularly to the disclosure in the drawings, the numeral 6 designates the main body of a modified gear-type pump having the rotors 8 and 10, which in keeping with this type of high speed pump construction, are normally mounted upon operating shafts which are geared together so that the impellers 8 and 10 do not carry any driving loads, but merely move the fluid pumped. The pump is provided with an inlet side 14 which is usually connected, as by hose, to a source of liquid to be pumped. On the opposite side of the impellers is the discharge opening 16. This normally is again connected with hose as 18, so that the water pumped may be led to any desired remote point.

Inset within the discharge opening 16 is my governing device or constrictor member 20. This is arranged to fit snugly into the enlarged discharge opening or bore 22, and to be preferably provided with a chambered leading face 24 and a decidedly flared discharge face 25. Disposed between these flared portions is a relatively short cylindrical portion 26.

It is to be noted that the cylindrical portion 26 should be of minimum overall length so that it will, in effect, be a restricting element similar to the nozzle and, if kept to the general proportions as indicated, it will be found that there will be very little loss in efficiency of the unit. This follows the general principles of hydraulics, that as long as bore 26 is several times the cross sectional area of the discharge orifice, and is not long enough to create friction loading, the end result is merely to build up a certain pressure at 28 in the discharge rotor chamber of the pump body, which would have the effect of decreasing the output quantity of water only when the hose in no way increases the pressure, as when it is relatively short and lying on the horizontal with the pump and without a nozzle secured to it. This, of course, is just the condition with which this device is so necessary in use.

Intermediate its ends, constrictor 20 is provided with an annular groove 30, and connecting with groove 30 is one or more water leading openings 32. This opening communicates freely with the pump discharge chamber 28, and on its other end communicates with groove 30, so that water under pressure circulates through groove 30 into the water supply pipe 34 going to the engine power head and also to pipe 35 which is led to the pressure indicating gauge 36.

Any convenient means may be employed to position member 20 in the discharge side of the pump. Normally, it has been found more convenient to merely press it firmly in place. However, many ways will occur to those skilled in this kind of work, for securing the member in position in accordance with the manufacturing facilities they have available or the specific use to which the pump is to be put.

The flow of water through the engine and how it is dependent upon a certain amount of pressure in chamber 28, will probably be best understood from a perusal of Figs. 3 and 4, in which it will be noted that on a common base 40 is mounted the pump 6 and the power head 42, together with the various associated essential parts. Fig. 4 is well illustrative of the flow of the water to the final discharge out the exhaust manifold 44, which is formed within base 40. In Fig. 4, water flow is shown by smooth arrows, and exhaust gases by wavy arrows.

It is believed that it will be clearly apparent from the above description and the disclosure in the drawings, that the invention comprehends a novel construction of a no-load speed governor.

Having thus described my invention, I claim:

1. A no-load speed governor for high-speed internal combustion engines used for driving high-speed pumps, consisting of: a constrictor element insertable in the discharge side of the pump and adapted to produce back pressure on the pump, said constrictor member having an axial bore of greater cross-sectional area than the nozzle normally used with the pump, but less than the normal discharge cross-sectional area of the pump, and means for drawing fluid from the pressure side of the pump for use in cooling the internal combustion engine.

2. A no-load speed governor for high-speed internal combustion engines driving high-speed pumps, consisting of: a constrictor member adapted for insertion in the discharge side of the pump and proportioned to produce a back pressure on the discharge side of the pump, said constrictor member having an axial cylindrical bore of greater cross-sectional area than the nozzle normally used with the pump, but less than the normal discharge cross-sectional area of the pump, a conical counterbore in said constrictor member facing the pump, a second conical counterbore in said constrictor facing the discharge hose coupling of the pump, and means for drawing fluid from the pressure side of the pump for use in cooling the internal combustion engine.

3. A no-load speed governor for high-speed internal combustion engines driving high-speed rotary pumps of the type having a fluid displacing rotor element and a suction and a discharge rotor chamber, consisting of: a cylindrical constrictor member inserted in the discharge bore of the pump and adapted to produce a back pressure on the discharge side of the pump, said constrictor member having an axial bore of greater cross-sectional area than the nozzle normally used with the pump, but less than the normal discharge cross-sectional area of the pump, an annular groove on the outer surface of said constrictor member, a channel connecting said groove with the discharge rotor chamber, a motor cooling water pipe connection in alignment with said groove and adapted for drawing fluid from the pressure side of the pump for use in cooling the internal combustion engine.

FRANCIS A. HARVEY.

REFERENCES CITED

The following references are of record in the file of this patent:

UNITED STATES PATENTS

| Number | Name | Date |
|---|---|---|
| 2,279,136 | Funk | Apr. 7, 1942 |
| 2,294,454 | Hathaway et al. | Sept. 1, 1942 |
| 2,310,078 | Herman | Feb. 2, 1943 |